United States Patent
Lampin et al.

(10) Patent No.: US 12,284,075 B2
(45) Date of Patent: Apr. 22, 2025

(54) NOTIFICATION METHOD RELATIVE TO AT LEAST ONE OPERATION IMPLEMENTED BY A DEVICE FORMING A NODE OF A NETWORK

(71) Applicant: Orange, Issy-les-Moulineaux (FR)

(72) Inventors: Quentin Lampin, Grenoble (FR); Dominique Barthel, Bernin (FR)

(73) Assignee: Orange, Issy-les-Moulineaux (FR)

( * ) Notice: Subject to any disclaimer, the term of this patent is extended or adjusted under 35 U.S.C. 154(b) by 659 days.

(21) Appl. No.: 15/739,889

(22) PCT Filed: Jun. 24, 2016

(86) PCT No.: PCT/FR2016/051567
§ 371 (c)(1),
(2) Date: Dec. 26, 2017

(87) PCT Pub. No.: WO2016/207576
PCT Pub. Date: Dec. 29, 2016

(65) Prior Publication Data
US 2018/0367375 A1    Dec. 20, 2018

(30) Foreign Application Priority Data

Jun. 25, 2015 (FR) .................................... 1555877
Nov. 30, 2015 (FR) .................................... 1561595

(51) Int. Cl.
*G06F 21/60* (2013.01)
*H04L 41/00* (2022.01)
(Continued)

(52) U.S. Cl.
CPC .......... *H04L 41/0686* (2013.01); *H04L 41/00* (2013.01); *H04L 41/12* (2013.01);
(Continued)

(58) Field of Classification Search
CPC ..... H04L 41/0686; H04L 41/00; H04L 41/12; H04L 67/10; H04L 67/26; H04L 67/12; H04L 67/55; H04L 41/34
See application file for complete search history.

(56) References Cited

U.S. PATENT DOCUMENTS 6,243,746 B1    6/2001 Sondur et al.
7,440,415 B2 *  10/2008 Wild, III ........... H04L 29/12009
                                                              370/254
(Continued)

FOREIGN PATENT DOCUMENTS

WO    2012111745 A1    8/2012
WO    WO-2012152824 A1 * 11/2012 ............. H04L 41/00

OTHER PUBLICATIONS

International Search Report dated Sep. 16, 2016, for corresponding International Application No. PCT/FR2016/051567, filed Jun. 24, 2016.
(Continued)

*Primary Examiner* — Schquita D Goodwin
(74) *Attorney, Agent, or Firm* — David D. Brush; Westman, Champlin & Koehler, P.A.

(57) ABSTRACT

A notification method is performed by at least a first device of a plurality of devices forming nodes of a network. The first device is suitable for sending and/or receiving at least one data message via a first communication link to and/or from at least one second device of the plurality. The notification method is adapted to the first device transmitting at least one notification message signaling at least one predetermined operation relating to at least one instance of the data message and performed by a functional entity of the first device, the notification message including an identifier of the first device, an identifier of the functional entity, an identifier of the operation, and an identifier common to all of the instances of the data message within the first device.

(Continued)

Also provided are a method and device for modeling the network from the notification messages.

20 Claims, 6 Drawing Sheets

(51) Int. Cl.
H04L 41/0686 (2022.01)
H04L 41/12 (2022.01)
H04L 67/10 (2022.01)
H04L 67/12 (2022.01)
H04L 67/55 (2022.01)

(52) U.S. Cl.
CPC ............. *H04L 67/10* (2013.01); *H04L 67/12* (2013.01); *H04L 67/55* (2022.05)

(56) References Cited

U.S. PATENT DOCUMENTS

| | | | | |
|---|---|---|---|---|
| 7,451,203 | B2 * | 11/2008 | Natarajan | H04L 29/12264 709/223 |
| 7,523,198 | B2 * | 4/2009 | Wu | H04L 43/12 709/201 |
| 7,881,221 | B2 * | 2/2011 | Arad | H04L 1/24 370/252 |
| 7,895,425 | B2 * | 2/2011 | Khalid | H04L 12/4633 709/226 |
| 8,117,301 | B2 * | 2/2012 | Kompella | H04L 43/50 709/224 |
| 8,861,397 | B2 * | 10/2014 | Kind | H04L 43/026 370/235 |
| 9,021,133 | B1 * | 4/2015 | Logue | H04L 67/10 709/245 |
| 9,111,280 | B2 * | 8/2015 | Sloan | H04L 51/226 |
| 9,122,599 | B1 * | 9/2015 | Jaladanki | G06F 11/0766 |
| 9,565,080 | B2 * | 2/2017 | Jain | H04L 41/5022 |
| 9,942,099 | B2 * | 4/2018 | Aldrin | H04L 41/12 |
| 10,230,588 | B2 * | 3/2019 | Cordray | H04L 69/40 |
| 2004/0223485 | A1 * | 11/2004 | Arellano | H04L 51/04 370/465 |
| 2006/0143181 | A1 * | 6/2006 | Liu | H04L 67/51 |
| 2006/0274791 | A1 * | 12/2006 | Garcia | H04L 43/0864 370/508 |
| 2007/0115967 | A1 * | 5/2007 | Vandenberghe | H04L 41/12 370/389 |
| 2007/0161367 | A1 * | 7/2007 | Dobrowski | H04W 40/10 455/412.1 |
| 2007/0286218 | A1 * | 12/2007 | Zhang | H04L 45/123 370/401 |
| 2010/0228843 | A1 * | 9/2010 | Ok | H04L 12/66 709/223 |
| 2011/0090334 | A1 * | 4/2011 | Hicks, III | G08B 13/19658 379/44 |
| 2012/0158994 | A1 * | 6/2012 | McNamee | H04L 41/12 709/238 |
| 2013/0304937 | A1 * | 11/2013 | Lee | H04L 45/74 709/238 |
| 2014/0122624 | A1 * | 5/2014 | Nerieri | H04L 67/55 709/206 |
| 2014/0259168 | A1 | 9/2014 | McNamee et al. | |
| 2014/0301192 | A1 * | 10/2014 | Lee | H04L 41/40 370/230 |
| 2014/0376405 | A1 * | 12/2014 | Erickson | H04L 67/12 370/254 |
| 2015/0215164 | A1 * | 7/2015 | Yoshimura | H04L 41/0213 709/221 |
| 2016/0007137 | A1 * | 1/2016 | Ahn | H04W 4/70 370/254 |
| 2016/0205435 | A1 * | 7/2016 | Stafford | H04L 41/12 725/127 |
| 2016/0261468 | A1 * | 9/2016 | Premkumar | H04L 41/147 |

OTHER PUBLICATIONS

English translation of the International Written Opinion dated Sep. 16, 2016, for corresponding International Application No. PCT/FR2016/051567, filed Jun. 24, 2016.

\* cited by examiner

NOTIFICATION METHOD RELATIVE TO AT LEAST ONE OPERATION IMPLEMENTED BY A DEVICE FORMING A NODE OF A NETWORK

CROSS-REFERENCE TO RELATED APPLICATIONS

This Application is a Section 371 National Stage Application of International Application No. PCT/FR2016/051567, filed Jun. 24, 2016, the content of which is incorporated herein by reference in its entirety, and published as WO 2016/207576 on Dec. 29, 2016, not in English.

FIELD OF THE INVENTION

The invention relates to the field of telecommunications.

More particularly, the invention relates to the field of observing telecommunications networks while they are in operation in order to verify their behavior or to measure their performance.

The invention applies particularly to networks made up of resource-constrained communicating objects.

BACKGROUND OF THE INVENTION

There are known systems for observing the state of each node in a network. In such systems, a central server, referred to as a network operation center (NOC), becomes informed about the operating parameters and performance measurements by explicitly interrogating the nodes of the network, i.e. the communicating objects, via the network while it is in operation. The interrogation is performed in particular by means of specific protocols such as the simple network management protocol (SNMP).

Firstly, that technique requires the use of bandwidth in the network. The amount of bandwidth used increases with the intensity of observation.

Secondly, since interrogations are asynchronous relative to the internal changes of state of the observed nodes, the interrogation process needs to be intense in order to hope to observe all successive states, even though there is no guarantee of success.

That has the negative effects of consuming large amounts of resources in the observed nodes whenever fine observation is required.

Such systems are well adapted to networks of nodes in which the nodes have large amounts of capacity in terms of bandwidth and energy.

In contrast, they are not adapted to networks of nodes in which the nodes are energy-constrained and/or bandwidth-constrained.

One of the objects of the invention is to remedy such insufficiencies and/or drawbacks of the prior art and/or to provide improvements thereto.

SUMMARY OF THE INVENTION

To this end, the invention relates to a notification method performed by at least a first device of a plurality of devices forming nodes of a network, said first device being suitable for sending and/or receiving at least one data message via a first communication link to and/or from at least one second device of the plurality.

According to the invention, the notification method includes a step of the first device transmitting at least one notification message signaling at least one predetermined operation relating to at least one instance of said data message and performed by a functional entity of said first device, said notification message including an identifier of said first device, an identifier of said functional entity, an identifier of said operation, and an identifier common to all of the instances of said data message within said first device.

Notification messages are sent by devices forming nodes (or node-forming devices) of a network. Each notification message signals that at least one operation has been performed by a node-forming device of a network from among a plurality of node-forming devices of the network.

More precisely, each notification message comprises an identifier of said first device, an identifier of said functional entity, an identifier of said operation, and an identifier common to all of the instances of said data message within said first device.

The various notification messages may subsequently be analyzed by a device that has received the messages or by a device suitable for accessing the received notification messages.

During the analysis, the identifier of the functional module (the functional entity) makes it possible to obtain details about the processing of a data message that has been received or that is to be sent, by means of a node-forming device. It is thus possible to detect behavior problems in a particular functional module.

For example, it is possible to identify a device that has failed, e.g. by observing that that it does not retransmit the data messages it receives.

Such detection enables the device in question to be repaired more quickly.

According to a characteristic of the notification method, the notification message includes an identifier of said operation. This operation identifier makes it possible to know precisely what processing has been performed by a device.

The data messages are exchanged via a first communication link. The sending of notification messages via a second communication link that is different from the first link makes it possible to avoid disturbing the exchange of data via the first communication link.

In a particular implementation of the invention, the first device sends a notification message on each occurrence of any one of the following operations:
 a data message being generated, e.g. by an application entity of said device;
 a functional entity of said device taking charge of a message received from another functional entity of said device;
 a data message being received from another device;
 a data message being sent to another device; and
 a data message being consumed by a functional entity of said device.

According to a particular characteristic of the notification message, said message identifier is generated by said first device on said first device receiving a data message via the first communication link or while the first device is generating a data message.

The first operation performed by a device relating to a data message is either receiving a data message or else creating a data message. The identifier common to all of the instances of the message within the device is then transmitted with the data message during transfer from one functional module of the device to another functional module of the invention. The data message may be modified by a functional module, but the associated message identifier does not vary.

The message identifier is unique within a device. This makes it possible to identify reliably the processing applied to a data message received or generated by the device.

According to another particular characteristic of the notification message, said notification message includes said data message.

Introducing a data message in notification messages makes it possible to determine the paths of data messages between devices by comparing the binary contents of the messages. In particular, it makes it possible to know which device(s) has/have received a data message sent by a device. Specifically, a data message that has been sent is received without modifying the data (contents) that it contains.

According to another particular characteristic of the notification method, which may be used on its own or in combination with the above characteristics, said notification message includes a timestamp.

Timing messages at the device serves to establish in reliable manner the order of notification messages, and consequently the order of the operations performed.

According to another particular characteristic of the notification method, that may be used on its own or in combination with the above characteristics, said at least one notification message is transmitted via a second communication link.

Thus, the node-forming devices of the network communicate with the other devices of the network via a first link and they signal the performance of operations that they perform via another link. The use of a communication link that is different from the first link for signaling the performance of an operation makes it possible to avoid disturbing the exchange of data messages between the various devices forming nodes of the network. This thus makes it possible to observe the network under real conditions of operation.

In a particular implementation, a notification message signaling an operation is transmitted by a node-forming device of the network at the moment when said operation is performed.

The messages are sent spontaneously by the node-forming devices, which thus signal the execution of the operations they perform.

The invention also relates to a method of modeling a network from notification messages sent by at least a first device of a plurality of devices forming nodes of the network, said first device being suitable for sending and/or receiving at least one data message via a first communication link to and/or from at least one second device of the plurality.

The method of modeling the network includes the following steps performed by a device for modeling the network:
  obtaining a plurality of notification messages sent by at least one device of the plurality of devices, a notification message signaling at least one predetermined operation relating to at least one instance of a data message and performed by a functional entity of said at least one device, said notification message including an identifier of said device, an identifier of said functional entity, an identifier of said operation, and an identifier common to all of the instances of said data message within said device;
  determining at least a portion of a path followed by at least one said data message within said network by analyzing received notification messages; and
  for at least one functional entity, determining a topology of the network at the level of abstraction of at least one said functional entity, by analyzing received notification messages.

The invention proposes a mechanism in which the administrator does not interrogate the nodes of the network directly, but interrogates in asynchronous manner a model of the network that is kept informed, either directly or indirectly and in incremental manner, by the nodes (optionally via relays or observation devices), each node supplying the model with additional information concerning its status progressively as its various entities perform the predetermined operations.

The invention makes it possible in particular for the administrator to reconstitute the path followed by a packet in the network, where the path followed by a packet may be defined as the set of entities of the various nodes passed through by the instances of the message between being created in a first node and being consumed in a last node.

The invention also makes it possible to determine how the various topologies vary at the various levels of abstraction at which the network is observed.

Consequently, it makes it possible to evaluate the operation of protocols, to diagnose finely problems of loss of connectivity, by determining the origins of these problems (loss of radio connectivity, routing loop, failed node, . . . ).

In a particular implementation of the method of modeling the network, at least some of said received notification messages include a said data message and said path comprises at least a first path portion within a device of the plurality of devices and a second path portion between a first device of said plurality and a second device of said plurality, said first path portion being determined as a function of said identifiers common to the instances of a given data message within a device and said second portion being determined by comparing data messages contained in said notification messages.

In a particular implementation of the modeling method, at least some of said received notification messages comprise a said data message, and wherein said topology, at a given level of abstraction, is obtained from the identifiers of functional entities included in said notification messages.

The invention also relates to a node-forming device of a network from among a plurality of node-forming devices of said network, said device being suitable for sending and/or receiving at least one data message via a first communication link to and/or from at least one second device of the plurality.

The device includes a communication module adapted to transmits a notification message signaling at least one predetermined operation relating to at least one instance of the data message and performed by a functional entity of said device, said notification message including an identifier of said device, an identifier of said functional entity, an identifier of said operation, and an identifier common to all of the instances of said message within said device.

The invention also relates to a device for modeling a network, the device comprising:
  a module for obtaining a plurality of notification messages coming from at least one node-forming device of a network from among a plurality of node-forming devices of said network, said device being suitable for sending and/or for receiving at least one data message via a first communication link to and/or from at least one second device of the plurality;
  a said notification message signaling at least one predetermined operation relating to at least one instance of a data message and performed by a functional entity of said device, said notification message including an identifier of said device, an identifier of said functional entity, an identifier of said operation, and an identifier common to all of the instances of said data message within said device; and a processor module adapted to analyze at least some of the notification messages received in order to reconstitute at least a portion of a path followed by at least one said data message within said network and to determine a network topology at the level of abstraction of a said functional entity.

In a preferred implementation, the various steps of the notification method or of the method of the network modeling method of the invention are performed by software or a computer program.

The invention thus provides software or a program suitable for being executed by a computer or by a data processor, the software/program including instructions for controlling the execution of steps of a notification method or of a method of modeling the network. These instructions are for storing in a memory of a computer device, and for loading and then executing by a processor of the computer device.

The software/program may use any programming language, and may be in the form of source code, object code, or code intermediate between source code and object code, such as in a partially compiled form, or in any other desirable form.

The computer device may be embodied by one or more physically distinct machines and present overall the architecture of a computer, including components of said an architecture: data memory(ies), processor(s), a communication bus, hardware interface(s) for connecting the computer device to a network or to other equipment, user interface(s), etc.

The invention also provides a data medium readable by a data processor and including instructions of a program as mentioned above. The data medium may be any entity or device capable of storing the program.

BRIEF DESCRIPTION OF THE DRAWINGS

Other features and advantages of the present invention appear from the following description of an embodiment given by way of non-limiting example, and with reference to the accompanying drawings, in which.

DETAILED DESCRIPTION OF ILLUSTRATIVE EMBODIMENTS

Appendices 1 and 2 provide examples of heuristics that can be used in a particular implementation of the invention.

The invention is implemented by means of software and/or hardware components. In this context, the term "module" may correspond in this document equally well to a software component or to a hardware component or to a set of hardware and/or software components, suitable for implementing a function or a set of functions as described below for the module in question.

A software component corresponds to one or more computer programs, one or more subprograms of a program, or more generally to any element of a program or of software. Such a software component is stored in memory and then loaded and executed by a data processor of a physical entity (terminal, server, gateway, set-top box, router, etc.) and it is capable of accessing the hardware resources of the physical entity (memories, data media, communications bus, input/output electronic cards, user interfaces, etc.).

In the same manner, a hardware component corresponds to any element of a piece of hardware. It may comprise a programmable hardware component or a component having an integrated processor for executing software, e.g. an integrated circuit, an integrated circuit (IC) card, an electronic card for executing firmware, etc.

Figure 1:
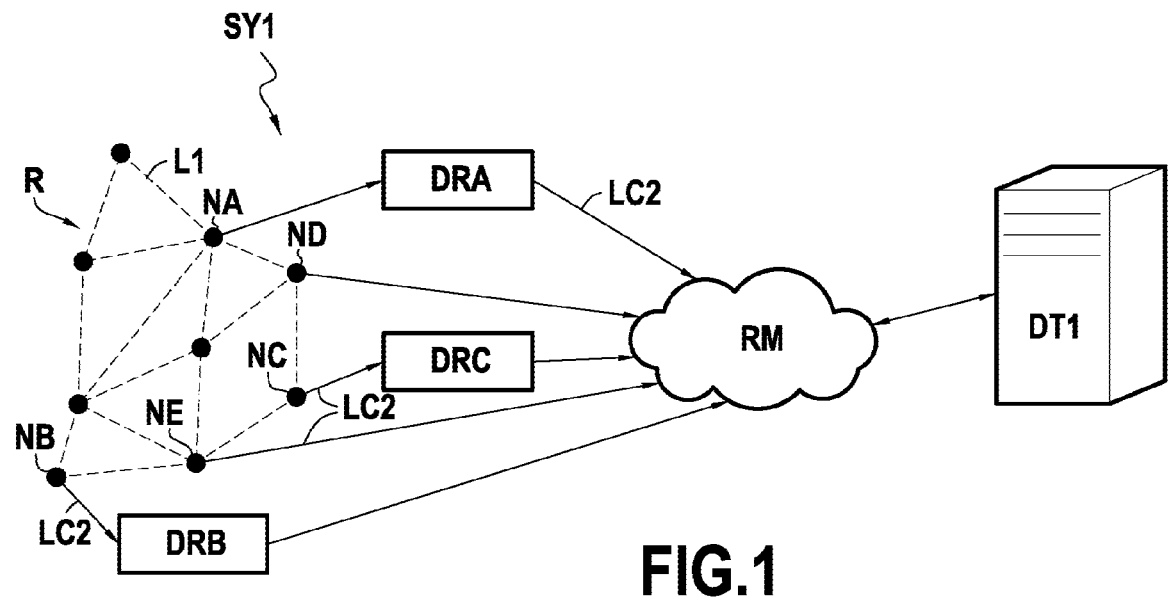
FIG. 1 is a general diagram showing a system in an embodiment of the invention.

FIG. 1 shows a system SY1 comprising a plurality of node-forming devices NA, NB, NC, ND, NE, ..., forming nodes of a network R and distributed in a geographical zone, together with a device DT1 for modeling the network of that network.

By way of example, a device of the plurality may be a sensor, e.g. a measurement sensor, such as a water or electricity meter.

More generally, such a device is a communicating object, i.e. a device suitable for transmitting data to one or more other devices of the plurality and/or for receiving data from another device of the plurality.

Each device of the plurality is thus suitable for communicating with one or more other devices of the plurality via a communication link L1, of which only some are represented by dashed lines.

The communication link L1 represents a "first" communication link in the meaning of the invention.

By way of example, the communication link L1 is a wireless link, e.g. a radio link. By way of example, the communication link may be of the WiFi type or of the Bluetooth type. By way of alternative, the communication link L1 may be a wired link.

Each device of the plurality is suitable for communicating with another device of the plurality, either directly, or else via one or more other devices of the plurality.

Each device of the plurality is also suitable for transmitting information, directly or otherwise, via a communication link LC2, to a device DT1 for modeling the network and connected to a communication network RM. The communication link LC2 constitutes a "second" communication link in the meaning of the invention.

In the embodiment described, the devices ND and NE communicate directly with the device DT1 for modeling the network, but the data transmitted by the devices NA, NB, NC pass via a relay device. Under such circumstances, a second communication link is a link connecting the device NA, NB, NC to the device DT1 for modeling the network via a relay device.

In the embodiment described, the second link LC2 differs from the first link L1.

For example, the first communication link L1 is a radio link at a first predetermined frequency, while the communication link LC2 is a radio link at a second predetermined frequency.

By way of alternative, the first communication link L1 is a wireless link of WiFi, Bluetooth, . . . type, or indeed a wired link.

Also by way of alternative, the communication link LC2 is a near-field wireless link, a WiFi or Bluetooth type wireless link, a wired link, . . . .

Also by way of alternative, the node-forming devices and the relay devices communicate via the first communication link L1.

Figure 2:
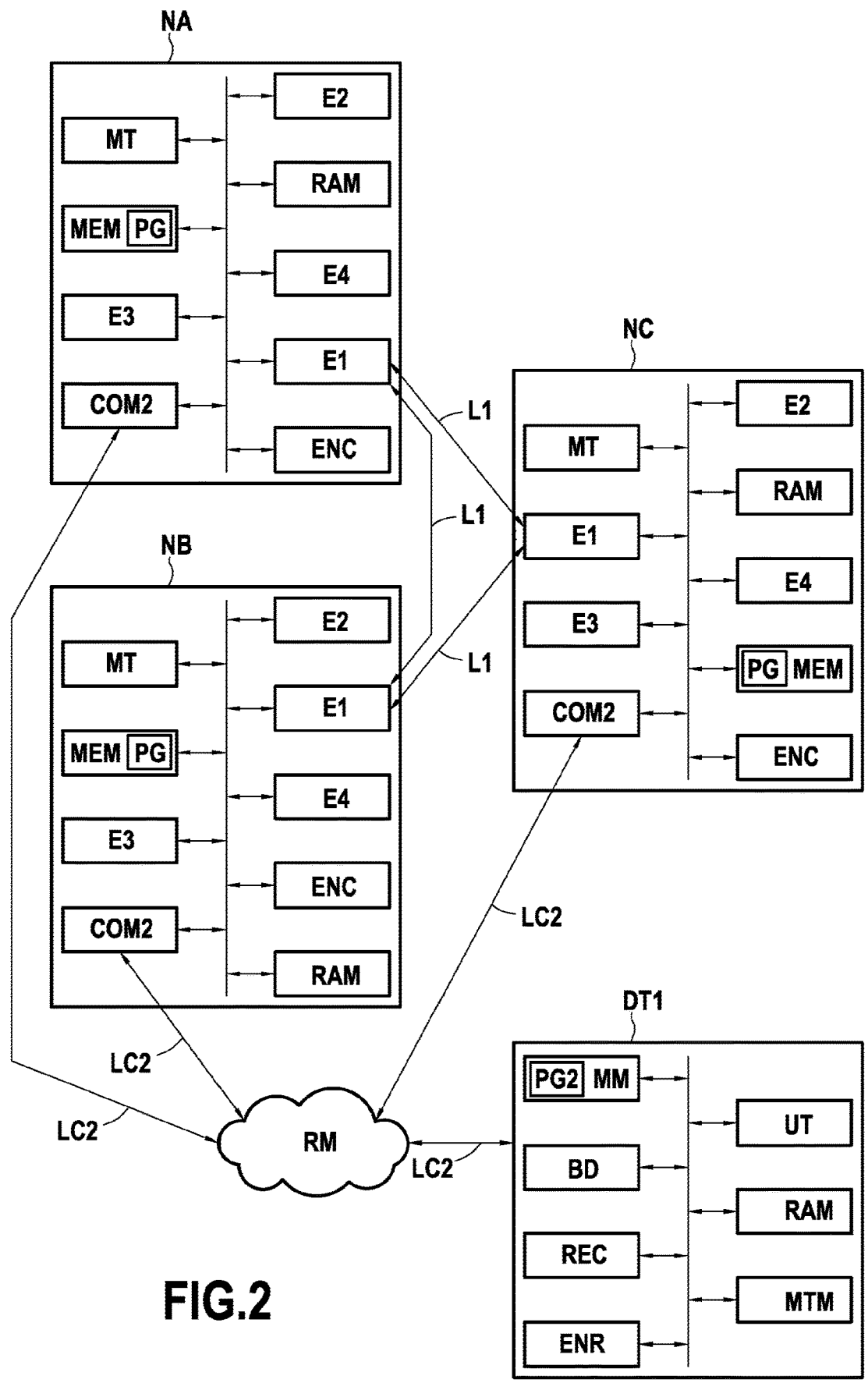
FIG. 2 is a block diagram showing three node-forming devices of a network and a modeling device of the network in an embodiment of the invention.

FIG. 2 is a block diagram showing three devices NA, NB, and NC of the plurality of devices together with the device DT1 for modeling the network, in an embodiment. The devices ND and NE are identical to the devices NA to NC.

Each device NA, NB, NC, ND, NE in the presently-described embodiment comprises an application functional entity (or module) E4, a routing functional entity E3, a link functional entity E2, a radiocommunication entity E1, and another communication module COM2.

The radio communication entity E1 is suitable for receiving and transmitting signals over the communication link L1. It is thus suitable for receiving signals from another device of the network R and for transmitting signals to another device of the network R.

The application entity E4 is suitable in particular for generating application data messages including content BC.

The routing entity E3 is suitable for editing application messages coming from the application entity E4 so as to add routing data thereto and for de-encapsulating messages coming from the link entity E2 in order to transmit them to the application layers.

The link entity E2 is suitable for editing messages coming from the routing entity E3 and adding link level information thereto, e.g. the MAC address of the device. It is also suitable for de-encapsulating the messages that it receives from the radio communication entity E1 in order to transmit them to the routing entity E3.

Each device NA, NB, NC, ND, NE thus comprises a plurality of functional modules or entities, in this example four functional entities E1, E2, E3, and E4, that are adapted to process received data messages or to transmit via the communication link L1.

No limitation is associated with the number or the natures of the functional entities.

In the present description, the terms "module" and "entity" are equivalent.

Each device NA, NB, NC, ND, NE also has a second communication module COM2 for communicating with the device DT1 for modeling the network via the communication link LC2, either directly or indirectly, possibly via a relay device.

In known manner, each device of the plurality also includes specifically a processor unit MT having a microprocessor, one or more storage memories MEM, e.g. of the electrically erasable programmable read only memory (EE-PROM) type, and a random access memory (RAM).

Figure 5A:
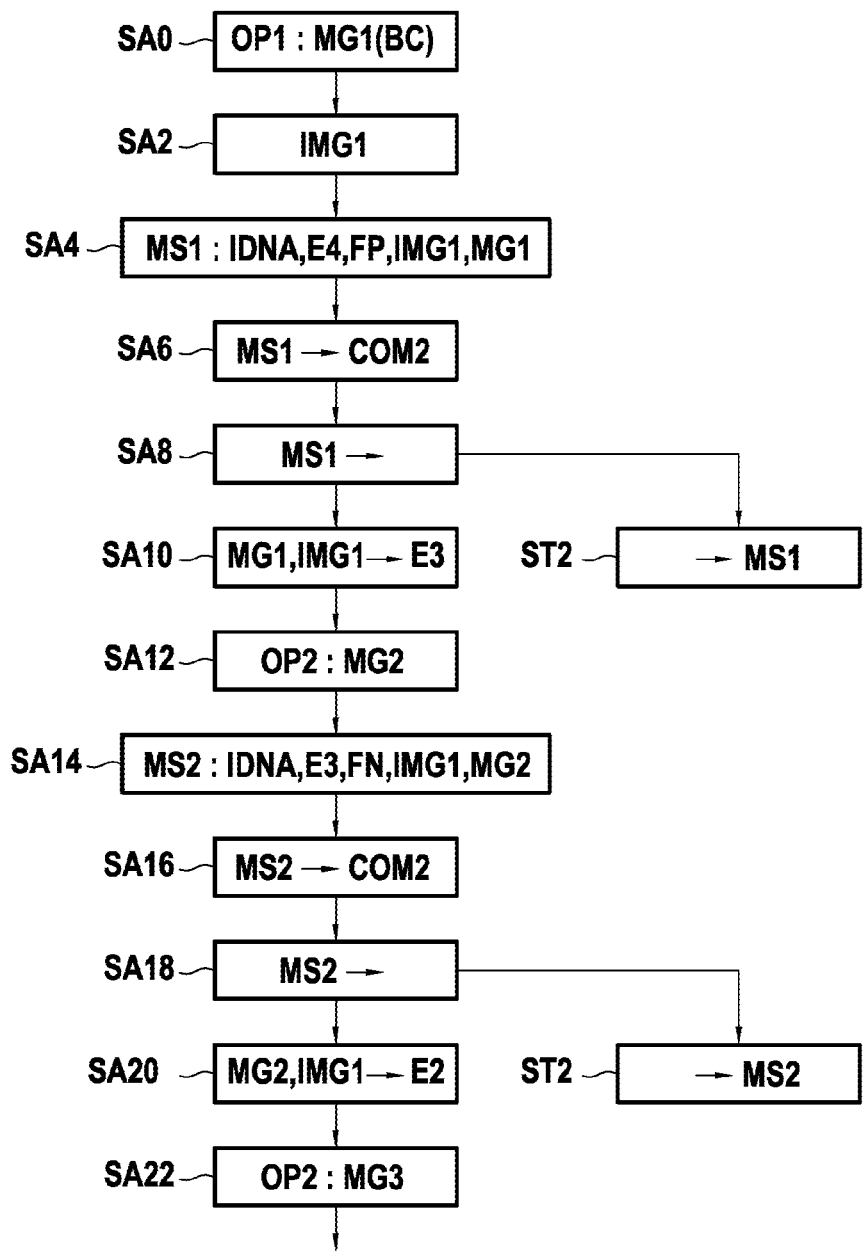
FIGS. 5a and 5b are flow charts showing various steps in a notification method and a modeling method of the network in a first implementation of the invention.
Figure 5B:
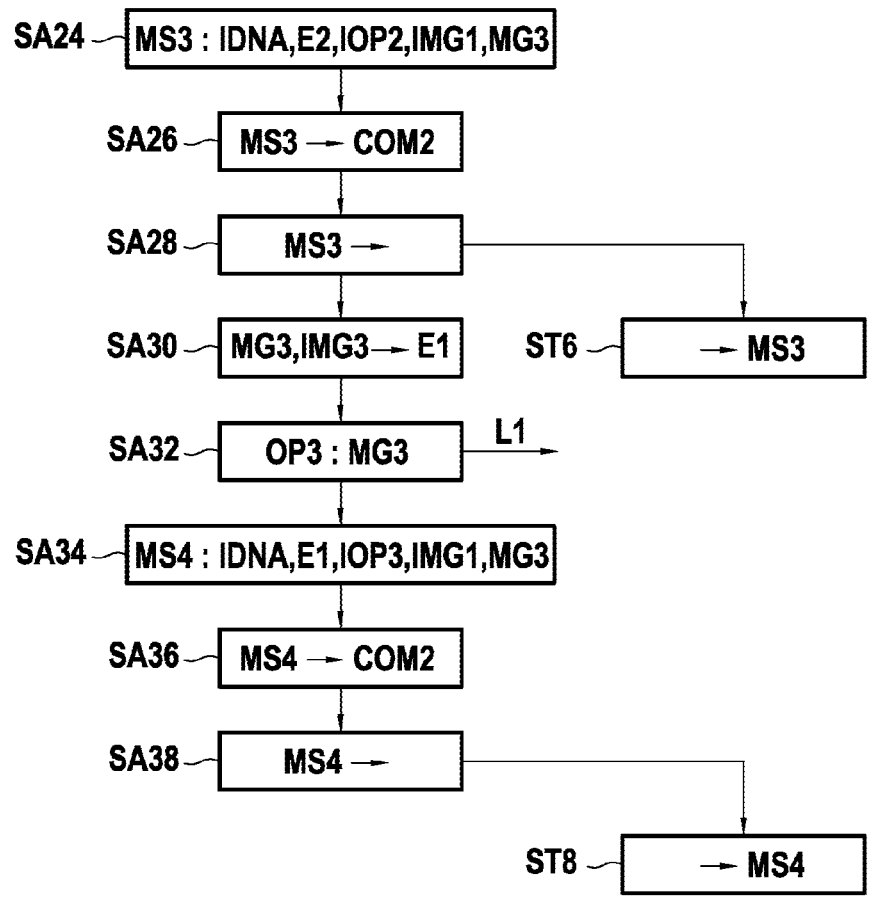

The storage memory MEM has registers storing a computer program PG including program instructions adapted to perform a notification method in an implementation of the invention as described below with reference to FIGS. 5*a* and 5*b*.

The device DT1 for modeling the network includes a processor unit UT having a microprocessor, one or more storage memories MM, e.g. of EEPROM type, and RAM.

The device DT1 for modeling the network includes in particular a storage memory BD.

The device DT1 for modeling the network also includes a receiver module REC, a registration module ENR, and a message processor module MTM.

The device DT1 for modeling the network may include in conventional and non-exhaustive manner the following elements: a keyboard, a display screen, a display module for displaying on the display screen, . . . .

Figure 6:
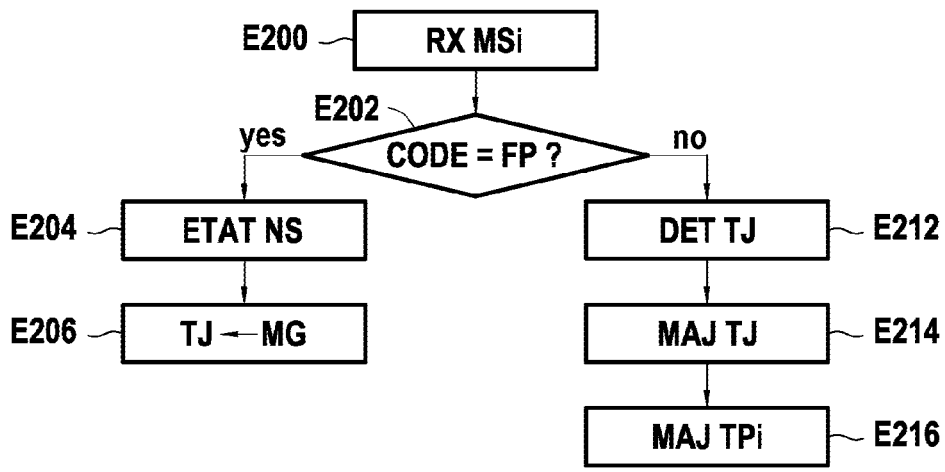
FIG. 6 is a flow chart showing various steps of a method of modeling the network in an implementation of the invention.

The storage memory MM includes registers storing a computer program PG2 including program instructions adapted to perform a method of modeling the network in an implementation of the invention and as described below with reference to FIG. 6.

Figure 3:
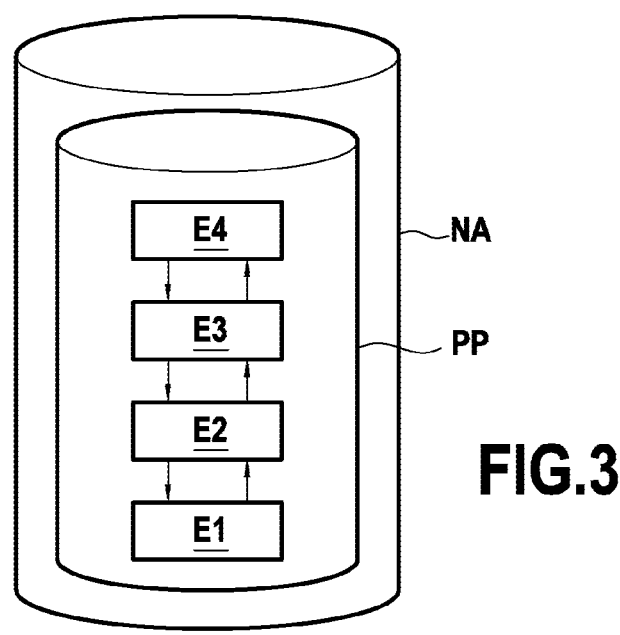
FIG. 3 shows various entities in a protocol stack of a node of the network.

With reference to FIG. 3, the protocol stack PP of a node of the network (e.g. NA) is modeled by a finite stack of entities Ei (four entities in FIG. 3), each of these entities being capable of communicating with the entities possibly located below and above that entity.

In the meaning of the invention, an entity may in particular refer to:
 a software entity, e.g. a protocol layer, e.g. a protocol layer in the meaning of the open systems interconnection (OSI) model (physical layer, data link MAC layer, network layer, transport layer, . . . , application layer, . . . ); or
 a hardware entity (radio module, power supply module, . . . ).

Each of these entities presents a certain number of properties that enable a status of the entity to be described.

The nodes of the network do not necessarily implement all the same entities.

Figure 4:
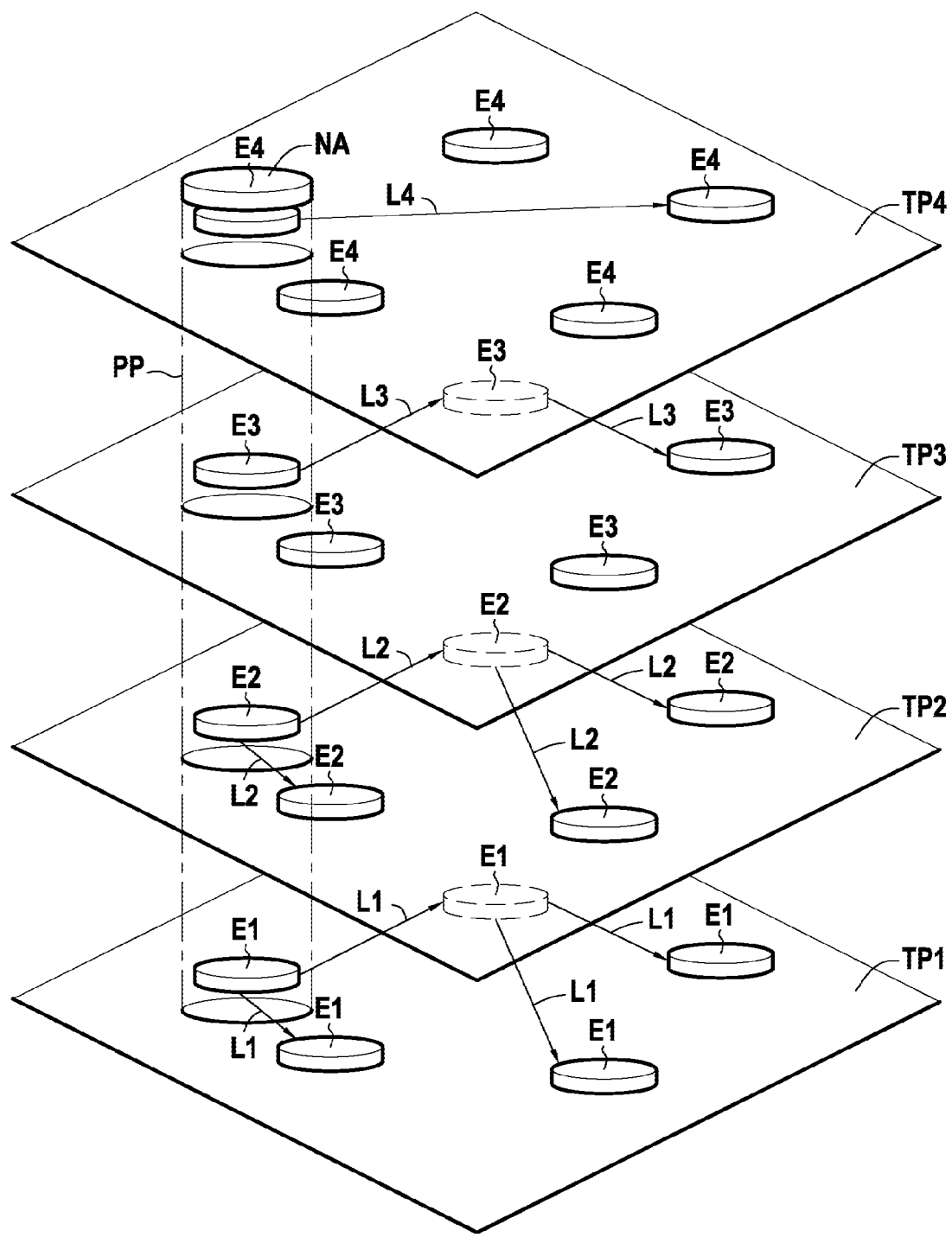
FIG. 4 shows topologies of the network with four levels of abstraction.

With reference to FIG. 4, knowledge of the properties of an entity Ek makes it possible to determine a topology TPk at a level of abstraction associated with that entity, the topology TPk corresponding, in the meaning of the invention, to the set of nodes that instantiate the entity Ek and the links used by that entity. For example:
 a "physical" topology TP1 may be defined by (wired, radio) links L1 interconnecting the pieces of equipment of the network (computers, concentrators, routers, . . . );
 a "data link" topology TP2 may be constructed by pruning all of the links of the topology TP1 so as to retain and store only a subset of links L2; in the example of FIG. 4, all of the links L1 of the physical topology are conserved;
 a "routing" topology TP3 may be constituted by pruning the data link topology TP2 so as to group together a selected set of links L3 for transmitting information step by step from a message creation node to a message consumption node. In the example of FIG. 4, only two links L3 of the underlying links are retained. In particular, it is possible in this routing topology to eliminate links between a concentrator and the computers connected to the concentrator, which do not participate in routing a message between its point of creation and its point of consumption; and
 an "application" topology TP4 may be obtained by eliminating elements of the routing topology TP3, in other words by ignoring all of the layers of level lower than the application layer so as to constitute a single virtual link L4 directly connecting an information creation point to an information consumption point, which points are themselves in reality incapable of communicating directly by radio.

An implementation of the notification method performed within the system SY1 is described below with reference to FIGS. 5A and 5B.

During a step SA0, the application entity E4 of the node NA generates a data message MG1. This data message has content CB, e.g. corresponding to measurements taken by a probe (not shown) of the device NA.

Generating the data message MG1 represents an operation FP of the "FrameProduce" type relating to the data message MG1.

During a step SA2, the application entity E4 of the device NA generates a message identifier IMG1. This identifier IMG1 is an identifier that is unique at the level of the device NA and that is used for all instances of the message MG1 within this device.

During a step SA4, the application entity E4 of the device NA constructs a notification message MS1. This notification message MS1 contains an identifier IDN1 of the device NA, an identifier E4 of the application entity E4 of the device NA, an identifier IFP of the FrameProduce operation FP performed during step SA0, the identifier IMGA of the instances of the message MG1, and the data message MG1.

The notification message MS1 may also contain timestamp information, e.g. the time at which the operation FP was performed.

The step SA4 is followed by a step SA6 during which the notification message MS1 is transmitted by the application entity E4 of the device NA to the communication module COM2 of the device NA. By way of example, the notification message MS1 is generated and transmitted simultaneously with performing the operation FP.

During a step SA8, the second communication module COM2 transmits the notification message MS1 to the device DT1 for modeling the network via the communication link LC2.

The notification message MS1 signals that the application entity E4 has performed the FrameProduce operation FP. It is transmitted spontaneously by the device NA via the communication link LC2.

The notification message MS1 is received by the device DT1 for modeling the network during a step ST2.

During a step SA10, the application entity E4 of the device NA sends the data message MG1 and the identifier IMG1 to the routing entity E3 of the device NA.

During a step SA12, after receiving the data message MG1, the routing entity E3 of the device NA constructs a second data message MG2 from the data message MG1 it has received. By way of example, the step SA12 consists in adding a routing header to the first data message MG1.

The message MG1 being taken in charge by the routing entity E3 in order to construct the second data message MG2 represents an operation FN of the FrameNotify type.

During a step SA14 the routing entity E3 of the device NA constructs a notification message MS2. The notification message MS2 contains the identifier IDNA of the device NA, an identifier E3 of the routing entity E3 of the device NA, an identifier IFN of the FrameNotify operation FN, the message identifier IMG1 of instances of the message MG1, and the second data message MG2.

The step SA14 is followed by a step SA16 during which the notification message MS2 is transmitted by the routing entity E3 of the device NA to the second communication module COM2 of the device.

During a step SA18, the communication module COM2 sends the notification message MS2 to the device DT1 for modeling the network via the communication link LC2.

The notification message MS2 signals that the routing entity E3 of the device NA has performed the FrameNotify operation FN. The notification message MS2 is received by the device DT1 for modeling the network during a step ST4.

During a step SA20, the routing entity E3 of the device NA sends the second message MG2 and the identifier IMG1 to the link entity E2 of the device NA.

During a step SA22, after receiving the data message MG2, the link entity E2 of the device NA constructs a third data message MG3 from the data message MG2. By way of example, the step SA22 consists in adding data, e.g. the MAC address of the device NA, to the data in the data message MG2.

The message MG2 being taken in charge by the link entity E2 to construct the data message MG3 represents an operation FN of the FrameNotify type.

During a step SA24, the link entity E2 of the device NA constructs a notification message MS3. The notification message MS3 contains the identifier IDNA of the device NA, the identifier E2 of the link entity E2 of the device NA, the identifier IFN of the FrameNotify operation FN, the identifier IMG1 of the instances of the message MG1, and the data message MG3.

The step SA24 is followed by a step SA26 during which the notification message MS3 is transmitted by the link entity E2 of the device NA to the second communication module COM2 of the device NA.

During a step SA28, the second communication module COM2 sends the notification message MS3 to the device DT1 for modeling the network via the communication link LC2.

The notification message MS2 signals the performance of the FrameNotify operation FN by the link entity E2 of the device NA. The notification message MS3 is received by the device DT1 for modeling the network during a step ST6.

During a step SA30, the link entity E2 of the device NA sends the message MG3 and the identifier IMG1 to the radio communication entity E1 of the device NA.

During a step SA32, after receiving the message MG3, the radio communication entity E1 generates a signal from the message MG3 and transmits this signal via the communication link L1.

The transmission of this signal over the radio link represents a FrameTransmit type operation FT.

During a step SA34, the radio communication entity E1 constructs a notification message MS4. This message contains the identifier IDNA of the device NA, an identifier E1 of the radio communication entity E1, an identifier IFT of the FrameNotify operation FT, the identifier IMG1 of instances of the message MG1, and the data message MG3.

The step SA34 is followed by a step SA36 during which the notification message MS4 is transmitted by the radio communication entity E1 of the device NA to the second communication module COM2 of the device NA.

During a step SA38, the second communication module COM2 sends the notification message MS4 to the device DT1 for modeling the network via the communication link LC2.

The notification message MS4 signals the performance of the FrameTransmit operation FT by the radio communication entity E1 of the device NA. The notification message MS4 is received by the device DT1 for modeling the network during a step ST8.

To summarize, the notification messages MS1 to MS4 include the identifier of the node IDNA, an identifier E4 to E1 of the entity originating an operation, an operation code (FP for FrameProduce, FN for FrameNotify, or FT for FrameTransmit), an identifier IMG1 representative of all of the instances MG1, MG2, MG3 of the message MG1 within the node NA, and the message MG1, MG2, or MG3 itself, each of these instances of the message including the content BC generated by the application entity E4 in step SAO.

The steps SAO to SA38 and ST2 to ST8 are reiterated to generate and send other data messages by the device NA.

The signal transmitted over the radio link L1 by the radio communication entity E1 of the node NA is received by each of the radio communication entities E1 of the nodes NB and NC.

Within the node NB:
the radio communication entity E1 receives the radio signal, obtains a message MG4 after demodulation, triggers sending a notification message MS5 to the device DT1 for modeling the network via the second communication module COM2, which notification message MS5 signals a FrameReceive type operation FR. In the presently-described implementation, the message MG4 is an instance of the data message MG1; and the radio communication entity E1 generates an identifier IMG4 used for all instances of the message MG4 within the node NDB and transmits the identifier IMG4 and the data message MG4 to the link entity E2. The link entity E2 de-encapsulates the data message MG4 in order to constitute another instance MG5 of the message MG1, consumes the message MG5, and triggers the sending of a notification message MS6 by the second communication means COM2 signaling a FrameConsume type operation FC.

The notification messages MS5 and MS6, include the identifier IDNB of the node NB, an identifier E1, E2 of the entity originating the notification message, an operation code (FR, FC), the identifier IMG4 of instances of the message MG4 within the node NB, and the message MG4, MG5, properly speaking. The message MG4, MG5 is an instance of the message MG1; it includes the content BC generated by the application entity E4 of the node NDA in step SAO.

Within the node NC:
the radio communication entity E1 receives the radio signal transited by the node NA, and after demodulation obtains a message MG6 constituting an instance MG6 of the data message MG1, and triggers the sending of a notification message MS7 by the communication module COM2 to the device DT1 for modeling the network, signaling a FrameReception type operation FR;

the radio communication entity E1 generates an identifier IMG6 for the instances of the message MG6 within the node NDC and transmits the identifier and the data message MG6 to the link entity E2. The link entity E2 de-encapsulates the data message MG6 in order to constitute another instance MG7 of the message MG6, transmits the message MG7 to the routing entity E3, and triggers the sending by the communication means COM2 of a notification message MS8 signaling a FrameNotification type operation FN by the entity E2;

the routing entity E3 modifies the data message MG6 to constitute another instance MG8 of the message MG6, and transmits the message MG8 to the link entity E2, and uses the second communication means COM2 to trigger the sending of a notification message MS9 signaling a FrameNotification type operation FN by the routing entity E3;

the link entity E2 modifies the data message MG8 to constitute another instance MG9 of the message MG6, transmits the data message MG9 to the radio communication entity E1, and triggers the sending of a notification message MS10 by the second communication means COM2 signaling a FrameNotification type operation FN by the link entity E2; and the routing entity E1 of the device NC generates a signal from the message MG9 and transmits this signal via the communication link L1. The transmission of this signal over the radio link represents a FrameTransmission type operation FT. The routing entity E1 of the device NB constructs a notification message MS11 signaling a FrameTransmission type operation FT and triggers the sending of this notification message MS11 by the second communication means COM2 to the device DT1 for modeling the network.

Each of these data messages MG7 to MG10 constitutes an instance of the data message MG1, and in particular includes the content BC.

The notification messages MS7 to MS11 include the identifier IDNC of the node NC, an identifier E1, E2, E3 of the entity originating the notification message, an operation code (FR, FN, FT), an identifier common to all of the instances of the message MG6 within the node NC, and an instance MG7 to MG11, each of these messages constituting an instance of the message MG1 including the content BC generated by the application entity E4 of the node NDA in step SAO.

The signal transmitted over the radio link L1 by the node NC is received by each of the radio communication entities E1 of the nodes ND and NE.

Within the node ND:
the radio communication entity E1 receives this radio signal, and after demodulation obtains a message MG10 corresponding to an instance of the message MG1, then triggers the sending of a notification message MS12 by the second communication module COM2 to the device DT1 for modeling the network, signaling a FrameReceive type operation FR; and the radio communication entity E1 generates an identifier IMG10 for the instances of the message MG10 within the node ND and transmits the identifier and the data message MG10 to the link entity E2. The link entity E2 de-encapsulates the data message MG10 in order to constitute another instance MG11 of the message MG10, consumes the message MG11, and triggers the sending of a notification message MS13 by the second communication means COM2, signaling a FrameConsume type operation FC.

The notification messages MS12, MS13 include the identifier IDND of the node ND, an identifier E1, E2 of the entity originating the notification message, an operation FR, FC, an identifier MG10 common to all the instances of the message MG10 within the node ND, and a message MG10, MG11 constituting an instance of the message MG1, these messages including the content BC generated by the application entity E4 of the node NDA in step SAO.

Within the node NE:
the radio communication entity E1 receives the radio signal transmitted by the node NC, after demodulation it obtains a message MG12, which message constitutes an instance of the data message MG1, and triggers the sending of a notification message MS14 by the second communication module COM2 to the device DT1 for modeling the network, signaling a FrameReceive type operation FR;

the radio communication entity E1 transmits the data message MG12 to the link entity E2. The link entity E2 de-encapsulates the data message MG12 so as to constitute another instance MG13 of the message MG12, transmits the identifier IMG12 and the data message MG12 to the routing entity E3, and triggers the sending of a notification message MS15 by the second communication means COM2 to the device DT1 for modeling the network, signaling a FrameNotify type operation FN by the link entity E2;

the routing entity E3 de-encapsulates the data message MG14 to constitute another instance MG12, transmits the message MG14 and the identifier IMG12 to the application entity E4, and triggers the sending of a notification message MS16 by the second communication means COM2 signaling a FrameNotify type operation FN by the routing entity E3; and the application entity E4 de-encapsulates the data message MG14 and consumes it. It triggers the sending of a notification message MS17 by the communication means COM2 signaling a FrameConsume type operation FC by the application entity E4.

The notification messages MS14 to MS17 include the identifier IDNE of the node NE, an identifier E1 to E4 of the entity originating the notification message, an operation code FR, FN, FC, an identifier IMG12 common to the instances MG12 to MG14 of the message MG1 within the node NE, and the message MG14 to MG17, which message includes the content BC generated by the application entity E4 of the node NDA in step SAO.

The notification messages MS1 to MS17 are received by the device for modeling the network.

An implementation of the method of modeling the network is described below with reference to FIG. 6.

In the presently-described implementation, on receiving a notification message (step E200), the reception module REC of the device DT1 for modeling the network registers the message in its storage memory BD. By way of example, the messages are registered in association with a time of reception added by the device DT1 for modeling the network. Alternatively, the received messages may include a timestamp.

In the presently-described implementation, when the received notification message includes an operation code FP representative of a new data message being generated (step E202), the device for modeling the network:

starts (step E204) a new status NS of the network corresponding to a period of time that is long enough to receive the notification messages corresponding to all of the instances of the message; and creates (step E206) a new path TJ associated with this first instance of the message.

In this example, the notification messages MS1 to MS17 are all classified by the device for modeling the network as belonging to the same status NS of the network.

When the notification message MS2 to MS17 includes an operation code other than the code FP, the device for modeling the network:

determines (step E212) the path with which to link this operation by comparing the contents. All of the messages MG2 to MG14 include a content CB that is identical to the content of the message MG1 such that, in this example, all of the messages MG1 to MG14 are attached to the same path TJ; and updates (step E214) the path TJ of the message through the various entities of the various nodes by implementing the heuristic of Appendix 1.

This heuristic takes place in a status NS of the network that corresponds to a period of time that is long enough to receive the notification messages corresponding to all of the instances of a given message. When the device NT1 for modeling the network receives a notification message about a data message, it seeks to make this data message correspond with any instances of the same data message that have already been declared as a result of some other operation. Thereafter it scans through the path to identify the nodes that have declared an instance of the same data message to the model.

Figure 7:
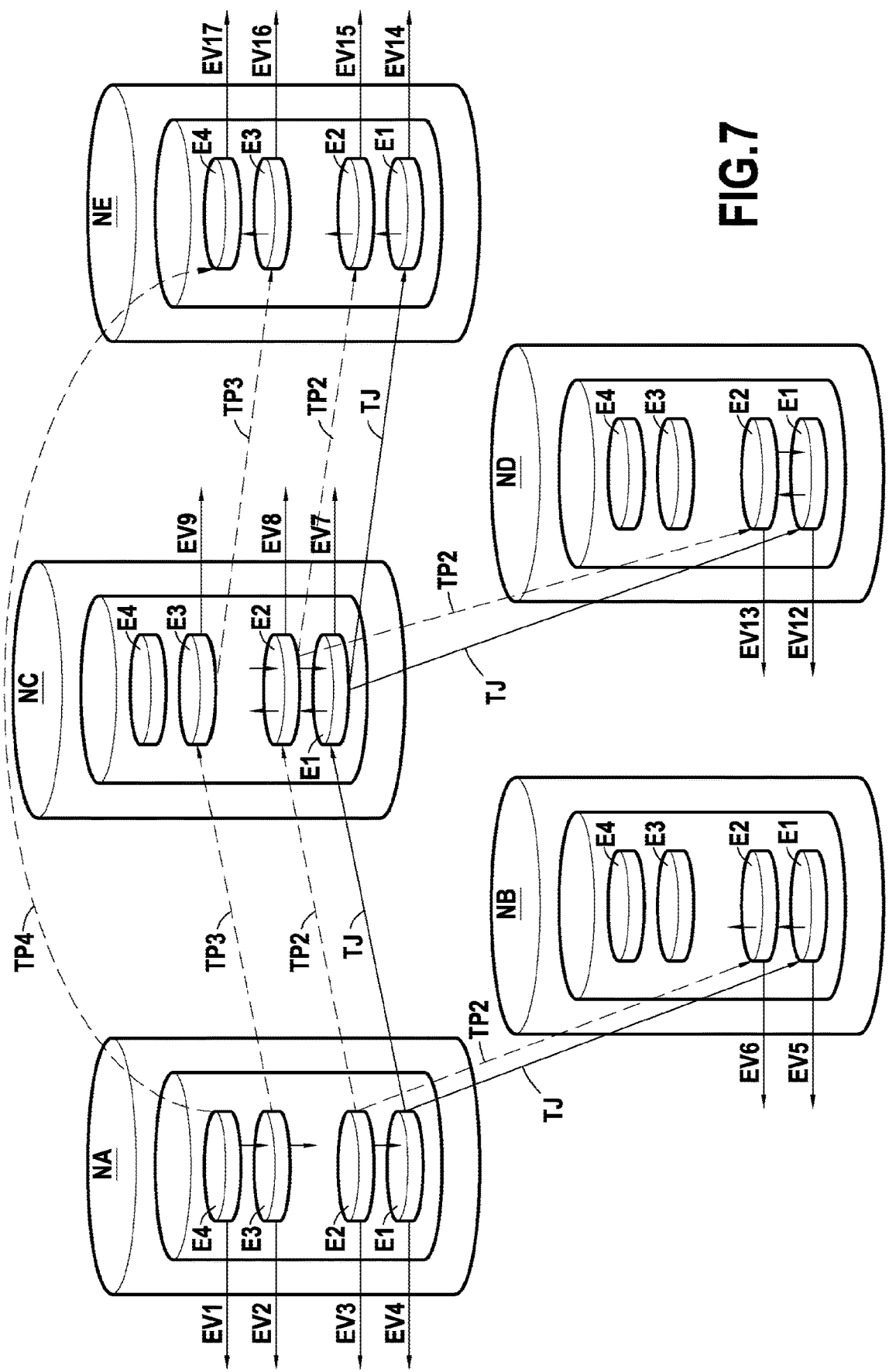
FIG. 7 is a diagram showing paths followed by data messages in an implementation and network topologies reconstituted by analyzing notification messages declared during operations relating to instances of the messages.

FIG. 7 shows this path TJ after receiving all of the instances MG1 to MG14 of the message MG1.

During a step E216, the device DT1 for modeling the network updates the topologies TP1 to TP4 by using the heuristic of Appendix 2, this step consisting in generating links between the entities of the nodes NA to NE at the levels of abstraction that corresponds to the various functional entities of those nodes.

FIG. 7 also shows said topologies after receiving all of the instances MG1 to MG14 of the message MG1.

In the implementation described, the operations performed and signaled by the devices forming the nodes are the following:

generating a data message;

a functional entity of a node taking charge of a received message coming from a functional entity of the same node, receiving or sending a data message by a node.

Other operations may be signaled.

Furthermore, in the presently-described example, the data message MG1 was generated (step SAO) by the application entity E4 of the node NA. The invention applies in the same manner if a message is generated by some other entity of the node, e.g. a routing entity.

In the described implementation, each functional entity signals only one operation per data message.

In a variant, a functional entity may signal a plurality of operations in a single data message. For example, it may signal taking charge of a data message, processing it, and then sending the message to another functional entity.

In the described implementations, each notification message transmitted to the device DT1 for modeling the network signals a single operation.

In an alternative, a notification message may signal a plurality of operations.

In the implementation described, each notification message includes an associated data message. In a variant, only those messages that signal receiving or sending data via the communication link L1 include an associated data message.

Under such circumstances, the paths within a node are reconstituted by using the single identifier used for all of the instances of a given message within the node.

In the implementation described, the notification messages are received and analyzed by a single piece of equipment, namely the device DT1 for modeling the network.

As an alternative, the notification messages are received and registered by a first piece of equipment and are then analyzed by a second piece of equipment. Under such circumstances, the notification messages are registered by the first piece of equipment in a memory that is accessible to the second piece of equipment, e.g. in a specific memory zone of a telecommunications network.

APPENDIX 1

```
frameOtherCasesMatcher: (frameId, nodeId, NS) ->
    for id, packet of NS.packets
        for record in packet.trajectory by reversedOrder
            if not match? and record.nodeId == nodeId and
record.frameId == frameId
                match = {'packet': packet, 'predecessor': null}
            if match? and (record.type == transmitFrame or
record.type == produceFrame)
                match.predecessor = record.nodeId
                return match
```

APPENDIX 2

```
linkAddition: (eventId, date, frameId, frame, nodeId,
entityId, NS) ->
    match = frameOtherCasesMatcher(frameId, entityId, NS)
    if match?
        createPacketRecord(match.packet.id, date, nodeId,
entityId, frameId, frame, eventId)
        if match.predecessor? and match.predecessor != nodeId
            link = createLink(match.predecessor, entityId,
nodeId)
```

Although the present disclosure has been described with reference to one or more examples, workers skilled in the art will recognize that changes may be made in form and detail without departing from the scope of the disclosure and/or the appended claims.

The invention claimed is:

1. A notification method performed by a first device of a plurality of devices forming nodes of a network, comprising:
sending and receiving a data messages via a first communication link to and from at least one second device of the plurality of devices; and
for each of said data messages:
performing, by a functional entity of the first device, a predetermined operation relating to an instance of said data message, said predetermined operation being performed prior to said sending or after said receiving of said data message; and
transmitting a notification message to a network modeling device, the notification message signaling the performance of the predetermined operation by the functional entity of the first device, said notification message including an identifier of said first device, an identifier of said functional entity, an identifier of said predetermined operation, and a message identifier unique at the level of the first device and common to each instance of a plurality of instances of said data message within said first device, wherein:
said data messages include at least one first data message and at least one second data message;
said message identifier of each of said at least one first data message is generated by said first device upon receiving said at least one first data message via the first communication link; and
said message identifier of each of said at least one second data message is generated by said first device while generating said second data message.

2. The notification method according to claim 1, wherein transmitting said notification message comprises transmitting said notification message on an occurrence of any one of the following operations:
generating one of said at least one first data message by an entity of said first device;
the functional entity of said first device taking charge of the one of said data messages received from another functional entity of said first device;
one of said at least one second data message being received from another device;
one of said at least one first or second data message being sent to another device; and
one of said at least one first or second data message being consumed by one said functional entity of said first device.

3. The notification method according to claim 1, wherein said first notification message includes said data message.

4. The notification method according to claim 1, wherein said notification message includes a timestamp.

5. The notification method according to claim 1, wherein said notification message is transmitted via a second communication link.

6. The notification method according to claim 1, wherein:
sending and receiving a data message via a first communication link to and from a second device of the plurality of devices comprises sending the data message via the first communication link to the at least one second device of the plurality of devices; and
said predetermined operation is performed prior to said sending of the data message.

7. The notification method according to claim 1, wherein:
sending and receiving a data message via a first communication link to and from a second device of the plurality of devices comprises receiving the data message via the first communication link from the second device of the plurality of devices; and
said predetermined operation is performed after said receiving of the data message.

8. The notification method according to claim 1, wherein the functional entity comprises a module of a protocol layer of an open systems interconnection model selected from the group consisting of an application layer, a network layer, a data link media access control layer, and a physical layer.

9. A method of modeling a network comprising a plurality of devices forming nodes of said network, a first device of the plurality of devices being capable of sending and receiving data messages via a first communication link to and from at least one second device of the plurality of devices, said method performed by a device for modeling the network and comprising:
receiving a plurality of notification messages sent by at least one device of the plurality of devices, each notification message signaling a respective predetermined operation relating to a respective instance of a data message, said respective predetermined operation performed by a respective functional entity of a respective device of the plurality of devices, said notification message including an identifier of said respective device, an identifier of said respective functional entity, an identifier of said respective predetermined operation, and a message identifier common to each instance of a plurality of instances of said data message within said respective device, wherein:
said data messages include at least one first data message and at least one second data message;
said message identifier common for said at least one first data message is generated by said at least one device sending said notification message upon receiving said at least one first data message via the first communication link; and said message identifier for said at least one second data message is generated while generating said at least one second data message;

determining a portion of a path followed by said data message within said network by analyzing the received notification messages; and determining, based on the received notification messages, a topology of the network at a selected level of abstraction associated with a first functional entity, said topology corresponding to a set of nodes instantiating said first functional entity and the communication links used by that first functional entity.

10. The method according to claim 9, wherein at least some of said received notification messages comprise said data message, and wherein said path includes a first path portion within the respective device and a second path portion between the first device and the second device of the plurality of devices, said first path portion being determined as a function of said message identifier common to all instances of the data message within the respective device and said second path portion being determined by comparing data messages contained in said notification messages.

11. The method according to claim 9, wherein at least some of said received notification messages comprise said data message, and wherein said topology is obtained from identifiers of functional entities included in said notification messages.

12. A modeling device for modeling a network comprising a plurality of devices forming nodes of said network, a first device of the plurality of devices being capable of sending and receiving data messages via a first communication link to and from a second device of the plurality of devices, the modeling device comprising:

a processor; and a non-transitory computer-readable medium comprising instructions stored thereon, which when executed by the processor configure the device to:

receive a plurality of notification messages sent by at least one device of the plurality of devices, each notification message signaling a respective predetermined operation relating to an instance of a data message, said respective predetermined operation performed by a respective functional entity of a respective device of the plurality of devices, said notification message including an identifier of said respective device, an identifier of said respective functional entity, an identifier of said respective predetermined operation, and a message identifier common to all instances of said data message within said respective device, wherein:

said data messages consist of at least one first data message and at least one second data message;

said message identifier is unique at the level of the first device, common to all instances of said data message, included in one of said notification messages, and unique at the level of this at least one sending device;

said message identifier for said at least one first data message is generated by said at least one device sending said notification message upon receiving said first data message via the first communication link; and said message identifier for said at least one second data message is generated while generating said at least one second data message;

analyze the plurality of notification messages to determine a portion of a path followed by said data message within said network; and determine, based on the plurality of notification messages, a network topology at a selected level of abstraction associated with a first functional entity, said topology corresponding to a set of nodes instantiating said first functional entity and the communication links used by that first functional entity.

13. The modeling device according to claim 12, wherein at least some of said received notification messages comprise said data message, and wherein said path includes a first path portion within the respective device and a second path portion between the first device and the second device of the plurality of devices, said first path portion being determined as a function of said message identifier common to all instances of the data message within the respective device and said second path portion being determined by comparing data messages contained in said notification messages.

14. The modeling device according to claim 12, wherein at least some of said received notification messages comprise said data message, and wherein said topology is obtained from identifiers of functional entities included in said notification messages.

15. A first device from among a plurality of devices forming nodes of a network, said first device comprising:

a processor; and a non-transitory computer-readable medium comprising instructions stored thereon, which when executed by the processor configure the first device to:

send and receive data messages via a first communication link to and from at least one second device of the plurality of devices; and for each of said data messages:

perform, by a functional entity of the first device, a predetermined operation relating to an instance of said data message, said predetermined operation being performed prior to said sending or after said receiving of said data message; and transmit a notification message to a network modeling device, the notification message signaling the performance of the predetermined operation by the functional entity of said first device, said notification message including an identifier of said first device, an identifier of said functional entity, an identifier of said predetermined operation, and a message identifier unique at the level of the first device and common to all instances of said data message within said first device, wherein:

said data messages include at least one first data message and at least one second data message;

said message identifier for each of said at least one first data message is generated by said first device upon receiving said at least one first data message via the first communication link; and said message identifier for each said at least one second data message is generated while generating said second data message.

16. The first device according to claim 15, wherein the instructions further configure the first device to transmit said notification message on an occurrence of any one of the following operations:

generating one said at least one first data message by an entity of said first device;

the functional entity of said first device taking charge of one said data message received from another functional entity of said first device;

one said at least one second data message being received from another device;

one said at least one first or second data message being sent to another device; and one said at least one first or second data message being consumed by one said functional entity of said first device.

17. The first device according to claim 15, wherein the instructions further configure the first device to generate said message identifier on receiving the data message via the first communication link or while generating the data message.

18. The first device according to claim 15, wherein said notification message includes said data message.

19. The first device according to claim 15, wherein said notification message includes a timestamp.

20. The first device according to claim 15, wherein said notification message is transmitted via a second communication link.

* * * * *